(12) United States Patent
Watanabe et al.

(10) Patent No.: US 10,988,090 B2
(45) Date of Patent: Apr. 27, 2021

(54) WIRE HARNESS SYSTEM

(71) Applicant: YAZAKI CORPORATION, Tokyo (JP)

(72) Inventors: Jin Watanabe, Shizuoka (JP); Naoyuki Yoshida, Shizuoka (JP); Shouya Shinogaya, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/550,177

(22) Filed: Aug. 24, 2019

(65) Prior Publication Data

US 2020/0101909 A1 Apr. 2, 2020

(30) Foreign Application Priority Data

Sep. 28, 2018 (JP) .............................. JP2018-185121

(51) Int. Cl.
*B60R 16/02* (2006.01)
*B60R 16/023* (2006.01)
*H01B 7/00* (2006.01)
*H02G 3/08* (2006.01)

(52) U.S. Cl.
CPC ...... *B60R 16/0207* (2013.01); *B60R 16/0239* (2013.01); *H01B 7/0045* (2013.01); *H02G 3/081* (2013.01)

(58) Field of Classification Search
CPC .................................................. B60R 16/207
USPC ........................................................ 174/72 A
See application file for complete search history.

(56) References Cited

U.S. PATENT DOCUMENTS

| | | | | |
|---|---|---|---|---|
| 5,928,004 A | * | 7/1999 | Sumida | B60R 16/0238 439/76.2 |
| 6,015,302 A | * | 1/2000 | Butts | B60R 16/0238 439/76.2 |
| 6,291,770 B1 | * | 9/2001 | Casperson | B60R 16/0207 174/139 |
| 2017/0008466 A1 | * | 1/2017 | Kikuchi | B60R 16/0207 |
| 2017/0057434 A1 | | 3/2017 | Nohara et al. | |
| 2020/0091638 A1 | * | 3/2020 | Yi | H01R 13/2464 |

FOREIGN PATENT DOCUMENTS

JP 05190215 * 1/1992 .............. H01R 4/24
JP 2015-230873 A 12/2015

* cited by examiner

*Primary Examiner* — Stanley Tso
(74) *Attorney, Agent, or Firm* — Kenealy Vaidya LLP (57) ABSTRACT

A wire harness system having a wire harness and a connection unit is provided. The connection unit includes a circuit network configuring a part of circuit lines for realizing selectively added specification in the wire harness. Selection circuit lines of an optional sub-harness branched from the trunk line of the wire harness are connected to the circuit network of the connection unit. Thus, connection or disconnection between the selection circuit lines and switching of connection among branches or the like of the selection circuit lines can be easily realized by changing the circuit network of the connection unit.

6 Claims, 10 Drawing Sheets

DIRECTION
OF VEHICLE

DIRECTION OF VEHICLE

DIRECTION OF VEHICLE

WIRE HARNESS SYSTEM

CROSS-REFERENCE TO RELATED APPLICATIONS

This application is based on and claims priority under 35 USC 119 from Japanese Patent Application No. 2018-185121 filed on Sep. 28, 2018, the contents of which are incorporated herein by reference.

TECHNICAL FIELD

The present invention relates to a wire harness system including a wire harness which includes a plurality of sub harnesses each configured by a predetermined circuit line.

BACKGROUND ART

A wire harness system mounted on a vehicle such as an automobile is generally configured as an assembly obtained by bundling, for example, a plurality of sub-harnesses respectively prepared for each system. The sub-harnesses to be bundled are prepared according to various required specification of the wire harness.

More Specifically, there are a wide variety of electrical components to be mounted in vehicles corresponding to vehicle types, vehicle grades, and optional equipment (an acoustic system, a power window system, etc.) selected according to a demand of a vehicle customer (driver). Therefore, circuit lines configuring power supply lines, ground lines, signal lines, and communication lines which are to be connected to the various electrical components, are variously different. In order to cope with such differences in circuit lines, a bundle of circuit lines to be mounted standardly (standard circuit lines) is provided as a standard sub-harness so as to operate a drive system in units of the drive system such as an engine and a motor. Further, in order to operate optional equipment or the like to be selectively mounted, a bundle of circuit lines (selection circuit lines) to be mounted selectively and additionally is provided as an optional sub-harness.

In recent years, application of Information Technology (IT) to vehicles such as automatic driving technology and external environment detection technology is rapidly advancing, and both standard circuit lines and selection circuit lines are tending to increase with the introduction of IT. That is, the number of types (kind) of sub-harnesses that needs to be prepared in advance is increasing significantly when mounting wire harnesses in a vehicle.

Therefore, in order to reduce the increase in the number of types of sub-harnesses, it is known to construct a wire harness system with a circuit substrate and a plurality of sub-harnesses by connecting the plurality of sub-harnesses to the circuit substrate and connecting the circuit lines of each sub-harness to each other through a circuit pattern on the circuit substrate (for example, see Patent Literature 1). In the wire harness, circuits such as branches can be provided in the circuit substrate for both the standard sub-harness and the optional sub-harness.

CITATION LIST

Patent Literature

Patent Literature 1: JP-A-2015-230873

SUMMARY OF INVENTION

That is, in the wire harness system of Patent Literature 1 described above, there is no need to provide branches in both the standard sub-harness and the optional sub-harness by using the circuit substrate. Therefore, a shape of the sub-harness is simplified without branches and the whole system can be standardized.

Meanwhile, tastes and hobbies of vehicles for each customer are extremely detailed and are more and more diverse. The increase in selection circuit lines selectively added depending on the type and grade of a predetermined vehicle may be significant. Therefore, it is assumed in the future that there is a demand to standardize even the optional sub-harnesses configured by selection circuit lines and reduce the number of types thereof.

The present invention has been made in view of the above circumstances, and an object thereof is to provide a wire harness system capable of improving work efficiency by simplifying assembling of a wire harness while reducing the number of types that needs to be prepared in advance for an optional sub-harnesses configured by selection circuit lines.

The object of the present invention is achieved by the following configurations.

(1) A wire harness system includes:

a wire harness having a standard sub-harness configured by standard circuit lines and an optional sub-harness configured by selection circuit lines, and a connection unit including a circuit network configuring a part of circuit lines for realizing selectively added specification in the wire harness, the optional sub-harness in the wire harness is branched from a trunk line of the wire harness, and the selection circuit lines of the optional s b-harness branched from the trunk line of the wire harness are connected to the circuit network of the connection unit.

(2) In the wire harness system described in (1), the wire harness is disposed on a body of a vehicle, the connection unit is stacked on an upper side of the trunk line of the wire harness.

(3) In the wire harness system described in (2), the connection unit further includes a case, the case is configured to accommodate the circuit network therein, and one surface of the case facing the trunk line of the wire harness when being stacked on the trunk line is supported by the body of the vehicle avoiding the trunk line.

(4) In the wire harness system described in (3), the wire harness is provided with a harness-side connector at a tip end portion of the optional sub-harness branched from the trunk line of the wire harness, the connection unit is provided with a unit-side connector at the circuit network, the unit-side connector is inserted in a fitting hole formed in a side surface of the case, and the harness-side connector and the unit-side connector are fitted to each other.

According to the configuration of the wire harness system in the above (1), connection or disconnection between the selection circuit lines and switching of connection among branches or the like of the selection circuit lines can be easily realized by changing the circuit network of the connection unit. Accordingly, even in a case where various connection states of the selection circuit lines are required in the optional sub-harness, the configuration of the optional sub-harness can be simplified and standardized. Therefore, work efficiency can be improved by simplifying assembling of the wire harness while reducing the number of types that needs to be prepared in advance for the optional sub-harnesses.

According to the configuration of the wire harness system in the above (2), since the connection unit is disposed in a vicinity of the wire harness, the connection unit can be compactly installed in a limited vehicle space while shortening a length of the optional sub-harness.

According to the configuration of the wire harness system in the above (3), the circuit network can be protected and accommodated inside the case of the connection unit, and the connection unit can be stably installed on the body of the vehicle.

According to the configuration of the wire harness system in the above (4), since the harness-side connector provided at the tip end of the optional sub-harness and the unit-side connector inserted in the fitting hole of the connection unit are detachably fitted to each other, the selection circuit lines of optional sub-harness can be easily connected to the circuit network and the work efficiency can be improved by simplifying assembling of the wire harness.

According to the wire harness system of the present invention, the connection unit includes the circuit network configuring a part of circuit lines for realizing selectively additional specification in the wire harness, and the selection circuit lines of the optional sub-harness branched from the trunk lines of the wire harness are connected to the circuit network of the connection unit. Thus, connection or disconnection between the selection circuit lines and switching of connection among branches or the like of the selection circuit lines can be easily realized by changing the circuit network of the connection unit. Accordingly, even in a case where various connection states of the selection circuit lines are required in the optional sub-harness, the configuration of the optional sub-harness can be simplified and standardized. Therefore, work efficiency can be improved by simplifying assembling of the wire harness while reducing the number of types that needs to be prepared in advance for the optional sub-harnesses.

The present invention has been briefly described above. Further, details of the present invention will be clarified by reading a mode (hereinafter, referred to as "embodiment") for carrying out the invention to be described below with reference to accompanying drawings.

DESCRIPTION OF EMBODIMENTS

A plurality of specific embodiments of the wire harness system of the present invention will be described below with reference to each drawing.

First Embodiment

Figure 1:
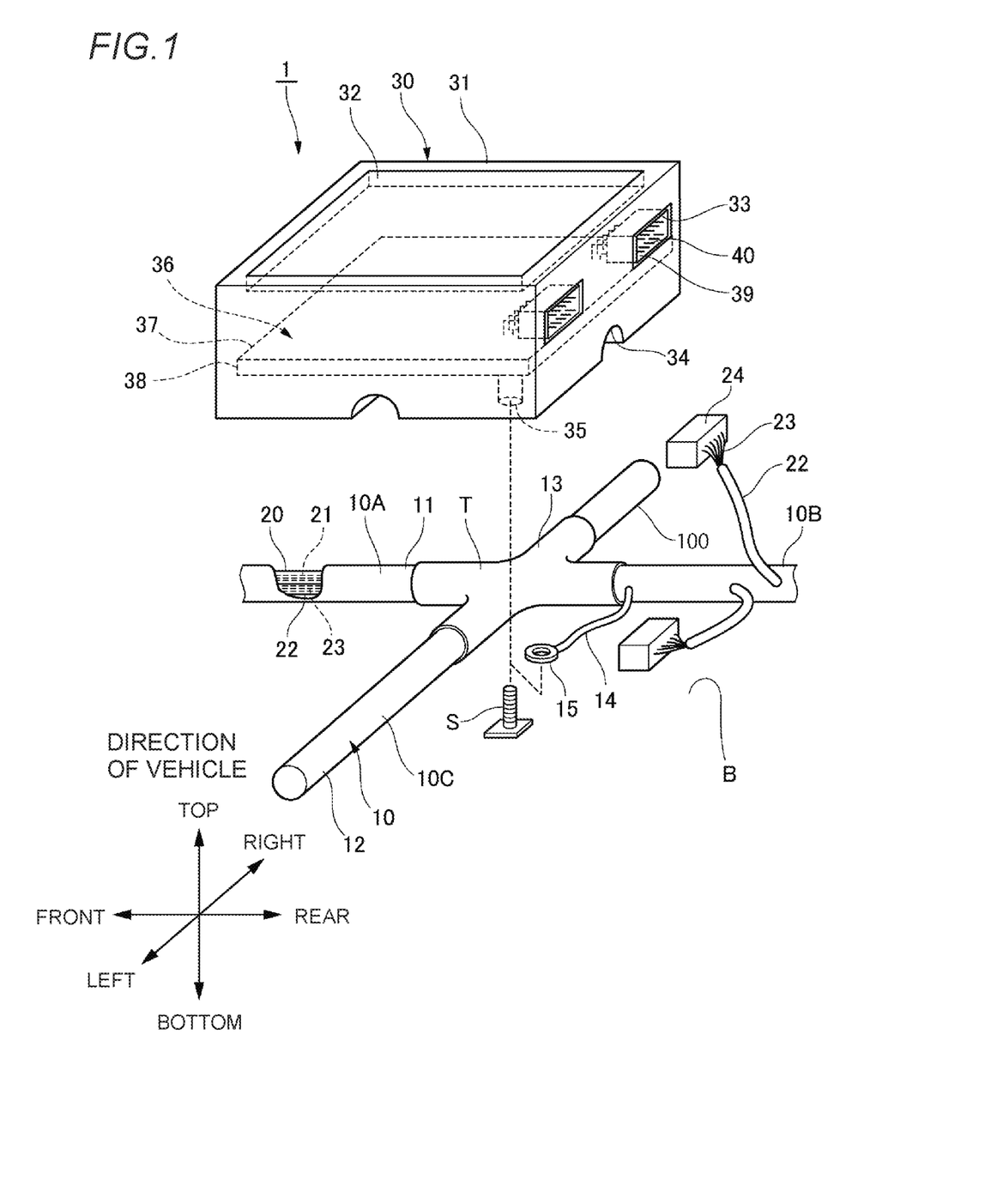
FIG. 1 is a perspective view illustrating a wire harness system according to a first embodiment of the present invention.
Figure 2:
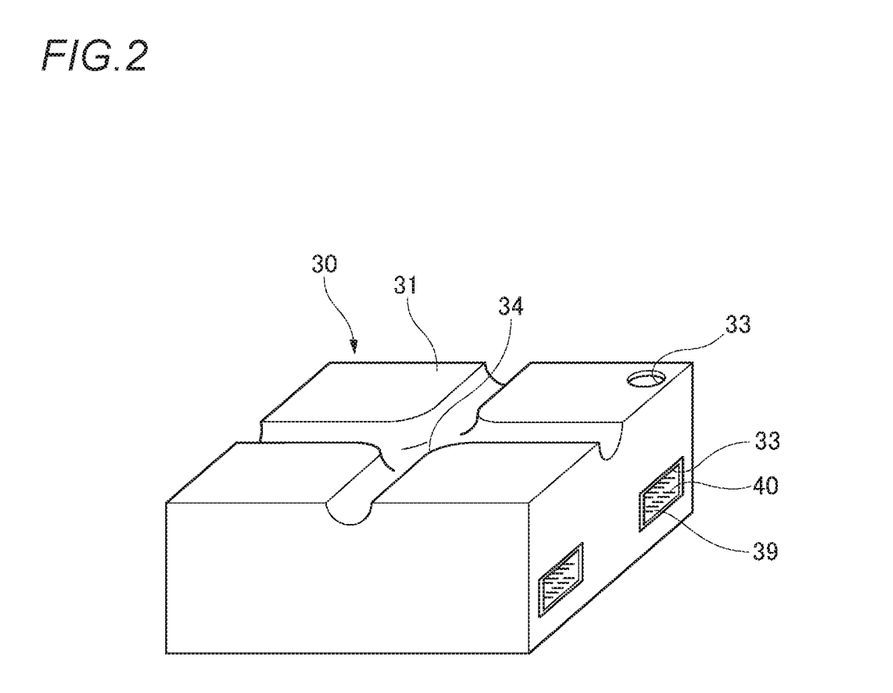
FIG. 2 is a perspective view showing a state where a connection unit shown in FIG. 1 is turned upside down.
Figure 3:
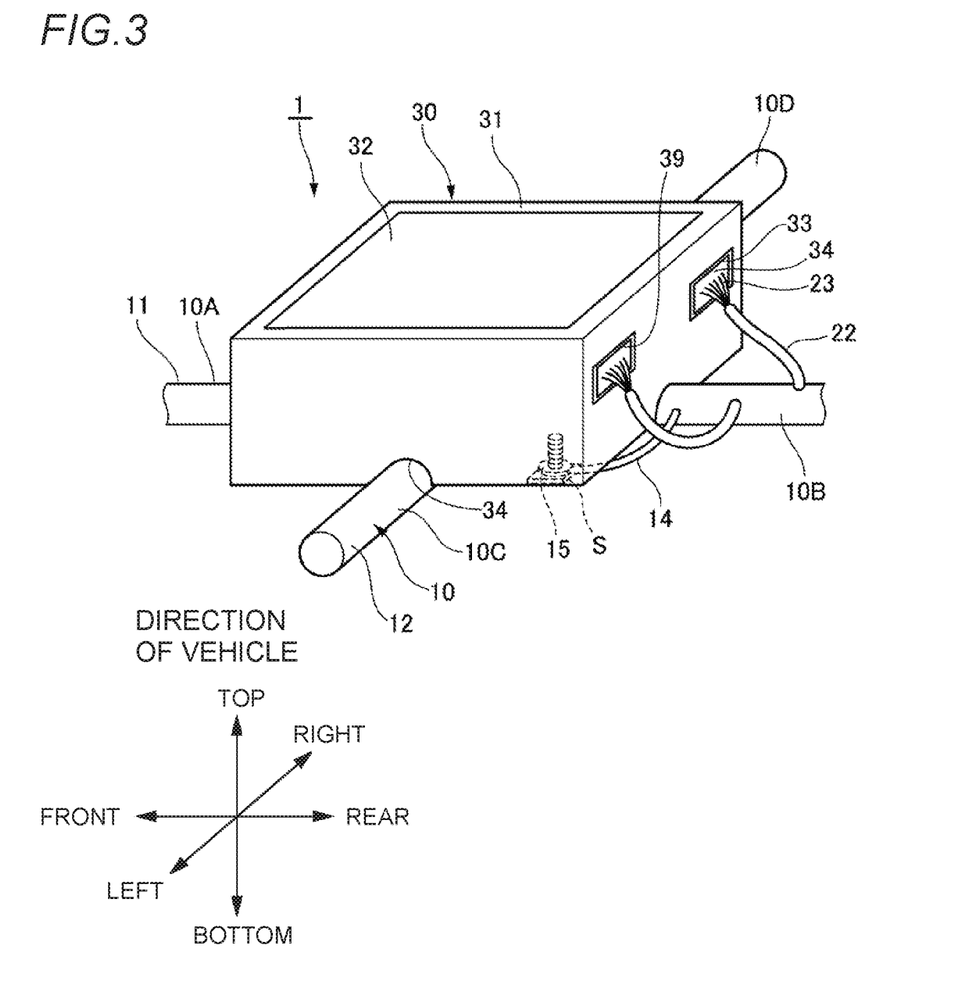
FIG. 3 is a perspective view showing a state where the connection unit shown in FIG. 1 is stacked and installed on trunk lines.

A wire harness system 1 according to a first embodiment of the present invention will be described with reference to FIGS. 1 to 3. FIG. 1 is a perspective view illustrating the wire harness system 1 according to the present embodiment. FIG. 2 is a perspective view showing a state where a connection unit 30 shown in FIG. 1 is turned upside down. FIG. 3 is a perspective view showing a state where the connection unit 30 shown in FIG. 1 is stacked and installed on trunk lines 11, 12.

(Overall Configuration of Wire Harness System)

First, an overall configuration of the wire harness system 1 of the embodiment in the present invention will be described.

As shown in FIGS. 1 and 3, the wire harness system 1 of the embodiment in the present invention is mounted on a vehicle such as an automobile. The wire harness system 1 includes a wire harness 10 disposed on a vehicle body (body) B as the first and second trunk lines 11, 12, and a connection unit 30 stacked and arranged on an upper side of the first and second trunk lines 11, 12 of the wire harness 10. A stud bolt S is erected on the vehicle body B, and the stud bolt S functions as an electrical ground of the vehicle.

The first trunk line 11 of the wire harness 10 is routed to extend in a vehicle front-rear direction on the vehicle body B. The second trunk line 12 of the wire harness 10 intersects the first trunk line 11 substantially at the right angle and is routed to extend in a vehicle left-right (width) direction on the vehicle body B. That is, the wire harness 10 of the embodiment in the present invention is routed in a substantially cross shape as a whole, and includes an intersecting portion 13 at which the first and second trunk lines 11, 12 intersect each other. At the intersecting portion 13 of the wire harness 10, the first and second trunk lines 11, 12 are provided so as not to be bulky by being braided in units of circuit lines 21, 23 to be described later. The intersecting portion 13 of the wire harness 10 and a periphery thereof are wound and covered with a tape T.

A portion of the first trunk line 11 located on a vehicle front side is also referred to as a front side portion 10A of the wire harness 10 with reference to the intersecting position 13 of the wire harness 10. Similarly, a portion located on a vehicle rear side is also referred to as a rear side portion 10B of the wire harness 10. Further, a portion of the second trunk line 12 located on a vehicle left side is also referred to as a left side portion 10C of the wire harness 10, and a portion located on a vehicle right side is also referred to as a right side portion 10D of the wire harness 10.

The wire harness 10 includes a standard sub-harness 20 configured by a plurality of standard circuit lines 21 and an optional sub-harness 22 configured by a plurality of selection circuit lines 23. The standard sub harness 20 and the optional sub-harness 22 are integrally bundled in each of the first and second trunk lines 11, 12 of the wire harness 10, and the first and second trunk lines 11, 12 are configured as an assembly including the sub-harnesses 20, 22.

At the rear side portion 10B of the wire harness 10, two optional sub-harnesses 22 are branched from the second trunk line 12. At a tip end portion of the optical sub harness 22, a harness-side connector 24 is provided, and is fitted to a unit-side connector 39 of the connection unit 30 described later. The harness-side connector 24 is a male connector, and is formed in a flat box shape by an electrically insulating synthetic resin or the like. The selection circuit lines 23 of the optional sub-harness 22 are connected to a side surface on one end of the harness-side connector 24. A plurality of conductive connection-receiving portions (not shown) are provided on a side surface on the other end of the harness-side connector 24 to be fitted to the unit-side connector 39 of the connection unit 30, and the connection-receiving portions are electrically connected with the selection circuit lines 23 of the optional sub-harness 22 respectively. Similarly, a ground wire 14 of the wire harness 10 is branched at the rear side portion 10B of the wire harness 10, and a ground terminal 15 is provided at a tip end of the ground wire 14. The ground terminal 15 of the ground wire 14 is a round terminal, and is electrically grounded by being inserted into the stud bolt S at an inner diameter thereof.

The connection unit 30 includes a substantially box-shaped case 31 and a circuit network 38 accommodated inside the case 31. The case 31 is formed of an electrically insulating synthetic resin or the like, and a lid 32 is detachably provided on a surface thereof. Maintenance or replacement can be appropriately performed on the circuit network 38 inside the case 31 by removing the lid 32. Two fitting holes 33 are formed adjacently in the vehicle left-right direction on a side surface on the vehicle rear side of connection unit 30, and unit-side connectors 39 are respectively fitted in the fitting holes 33 so as not to be exposed to the outside. The unit-side connector 39 is formed in a substantially box shape by electrically insulating synthetic resin or the like, a side surface on one end of the unit-side connector 39 is formed to be open to the vehicle rear side, and a plurality of conductive connection portions 40 are provided to be exposed. The connection portions 40 in the unit-side connector 39 and the connection-receiving portions of the harness-side connector 24 are electrically connected by fitting the harness-side connector 24 of the optional sub-harness 22 to the unit-side connector 39 of the connection unit 30.

Next, each configuration component will be described in detail.

(Standard Sub-Harness and Optional Sub-Harness)

Next, the standard sub-harness and the optional sub-harness will be further described.

As shown in FIGS. 1 to 3, the standard sub-harness 20 includes a plurality of standard circuit lines 21. The optional sub-harness 22 includes a plurality of selection circuit lines 23. At least one of the plurality of standard circuit lines 21 and selection circuit lines 23 is a circuit line for supplying power, at least another one is a ground wire for grounding, and at least more anther one is a signal line or a communication line for transmitting a signal.

Each of the standard circuit lines 21 and the selection circuit lines 23 is covered with an electrically insulating synthetic resin or the like around a conductor such as a stranded wire. In the standard circuit line 21, a thickness of the conductor, a thickness of the covering, and a material thereof are determined according to a current value and a voltage value which are changed depending on specification of the vehicle type and grade of the vehicle. A length or the like of the selection circuit line 23 is determined according to the specification of the optional sub-harness 22.

Many of the standard circuit lines 21 relate to basic functions of a vehicle, for example, a drive system such as an engine or a motor, and are circuit lines which are mounted standardly on all vehicles. Meanwhile, many of the selection circuit lines 23 relate to additional (optional) functions of a vehicle, such as an acoustic system and a power window system, and are circuit lines to be selectively mounted according to the demand of a vehicle customer (driver).

(Connection Unit)

Next, the connection unit will be further described.

As shown in FIGS. 1 to 3, the connection unit 30 includes the substantially box-shaped case 31 and the circuit network 38 accommodated inside the case 31, and is stacked and arranged on the intersecting portion 13 of the first and second trunk lines 11, 12 of the wire harness 10.

The circuit network 38 configures a part of circuit lines for realizing selectively additional specification in the wire harness 10 and is provided on a thin plate-shaped circuit substrate 36. Specifically, the circuit substrate 36 includes an electrically insulating substrate body 37, and the circuit network 38 is formed on the substrate body 37 as a printed circuit substrate. In a case of forming a relatively complex circuit network 38, the circuit network 38 is formed on the substrate body 37 of the circuit substrate 36 using a multi-layer printed circuit substrate. Two unit-side connectors 39 described above are disposed on the circuit substrate 36, and the unit-side connectors 39 face the outside through the fitting holes 33 of the case 31.

The circuit network 38 is formed as a wiring pattern, of conductive foil such as copper foil, attached to a front surface, a back surface, or an interface of layers in a thickness direction of the substrate body 37 of the circuit substrate 36. That is, the circuit network 38 includes a plurality of wirings in the wiring pattern, and is electrically connected to a side surface on the other end of the unit-side connector 39 via the wirings of the circuit network 38. The two unit-side connectors 39 are also connected to each other via the wirings of the circuit network 38 in part or all. Although the plurality of wirings are electrically separated from one another, a part of the wirings are electrically connected to one another. In a case where the plurality of wirings are separated at intersecting positions in a plane, the wirings are arranged on different planes or layers so as to be electrically separated. In a case where the wirings disposed on different planes or layers are connected to each other, the substrate body 37 of the circuit substrate 36 is electrically connected using a through hole penetrating in the thickness direction. Thus, connection or disconnection of the selection circuit lines 23 of the optional sub-harness 22 and switching of connection among branches or the like of the selection circuit lines 23 can be easily realized by appropriately changing the circuit network 38.

Further, as shown in FIGS. 1 to 3, in the case 31 of the connection unit 30, a housing groove 34 for housing the intersecting portion 13 of the wire harness 10 and a peripheral portion thereof inside is formed in a substantially cross shape on one surface of the case 31 facing the first and second trunk lines 11, 12, that is a back surface of the case 31. A cross section of the housing groove 34 is formed in an arc shape with a predetermined gap with respect to a cross-sectional outer shape of the first or second trunk lines 11, 12. A bolt insertion hole 35 for inserting of the stud bolt S is formed on the back surface of the case 31 along a height direction of the case 31. A ground wire of the circuit network 38 faces the bolt insertion hole 35, and when the stud bolt S is inserted into the bolt insertion hole 35, a tip end of the stud bolt S is in contact with the ground wire, so that the circuit network 38 is electrically connected.

The cross section of the housing groove 34 of the case 31 may be formed substantially in a C shape such that a width of an opening of the housing groove 34 is smaller than a diameter of the arc. In this case, the first and second trunk lines 11, 12 can be held stably inside the housing groove 34.

(Installation of Wire Harness System)

Next, installation of the wire harness system will be described.

As shown in FIG. 3, in the wire harness system 1 configured as above, the harness-side connectors 24 of the optional sub-harness 22 branched from the second trunk line 12 of the wire harness 10 are fitted to the unit-side connectors 39 of the connection unit 30. Accordingly, the selection circuit lines 23 of the optional sub-harness 22 are connected to the circuit network 38. When the case 31 of the connection unit 30 is stacked and installed to cover the intersecting portion 13 of the wire harness 10 and the periphery thereof, a part of the first and second trunk lines 11, 12 is housed inside the housing groove 34 of the case 31. As a result, the case 31 of the connection unit 30 is stably supported by surface contact with the vehicle body B on the back surface thereof at a portion rather than the housing groove 34 while avoiding the first and second trunk lines 11, 12. Further, when the connection unit 30 is installed, the stud bolt S of the vehicle body B is inserted into the bolt insertion hole 35 of the case 31, and the circuit network 38 of the connection unit 30 is grounded.

(Advantage of Wire Harness System of First Embodiment)

As described above, according to the wire harness system 1 of the present embodiment, the connection unit 30 includes the circuit network 38 configuring a part of circuit lines for realizing selectively additional specification in the wire harness 10. Further, the selection circuit lines 23 of the optional sub-harness 22 branched from the second trunk line (main line) 12 of the wire harness 10 are connected to the circuit network 38 of the connection unit 30. Thus, connection or disconnection between the selection circuit lines 23 and switching of connection among branches or the like of the selection circuit lines 23 can be easily realized by changing the circuit network 38 of the connection unit 30. Accordingly, even in a case where various connection states of the selection circuit lines 23 are required in the optional sub-harness 22, the configuration of the optional sub-harness 22 can be simplified and standardized. Therefore, work efficiency can be improved by simplifying assembling of the wire harness 10 while reducing the number of types that needs to be prepared in advance for the optional sub-harnesses 22.

According to the wire harness system 1 of the present embodiment, since the wire harness 10 is disposed on the vehicle body (body) B, and the connection unit 30 is stacked on the upper side of the trunk lines 11, 12 of the wire harness 10, the connection unit 30 is disposed in a vicinity of the wire harness 10. Therefore, the connection unit 30 can be compactly installed in a limited vehicle space while shortening a length of the optional sub-harness 22.

According to the wire harness system 1 of the present embodiment, the connection unit 30 further includes the case 31. Further, the case 31 accommodates the circuit network 38 inside, and the back surface of the case 31 (one surface of the case 31 facing the trunk lines 11, 12 of the wire harness 10 when being stacked on the trunk lines) is supported by the vehicle body (body) B avoiding the trunk lines 11, 12. Therefore, the circuit network 38 can be protected and accommodated inside the case 31 of the connection unit 30, and the connection unit 30 can be stably installed on the vehicle body B.

According to the wire harness system 1 of the present embodiment, the harness-side connectors 24 provided at the tip end of the optional sub-harness 22 are detachably fitted to the unit-side connectors 39 inserted into the fitting holes 33 of the connection unit 30. Therefore, the selection circuit lines 23 of optional sub-harness 22 can be easily connected to the circuit network 38 and the work efficiency can be improved by simplifying assembling of the wire harness 10.

Second Embodiment

Figure 4:
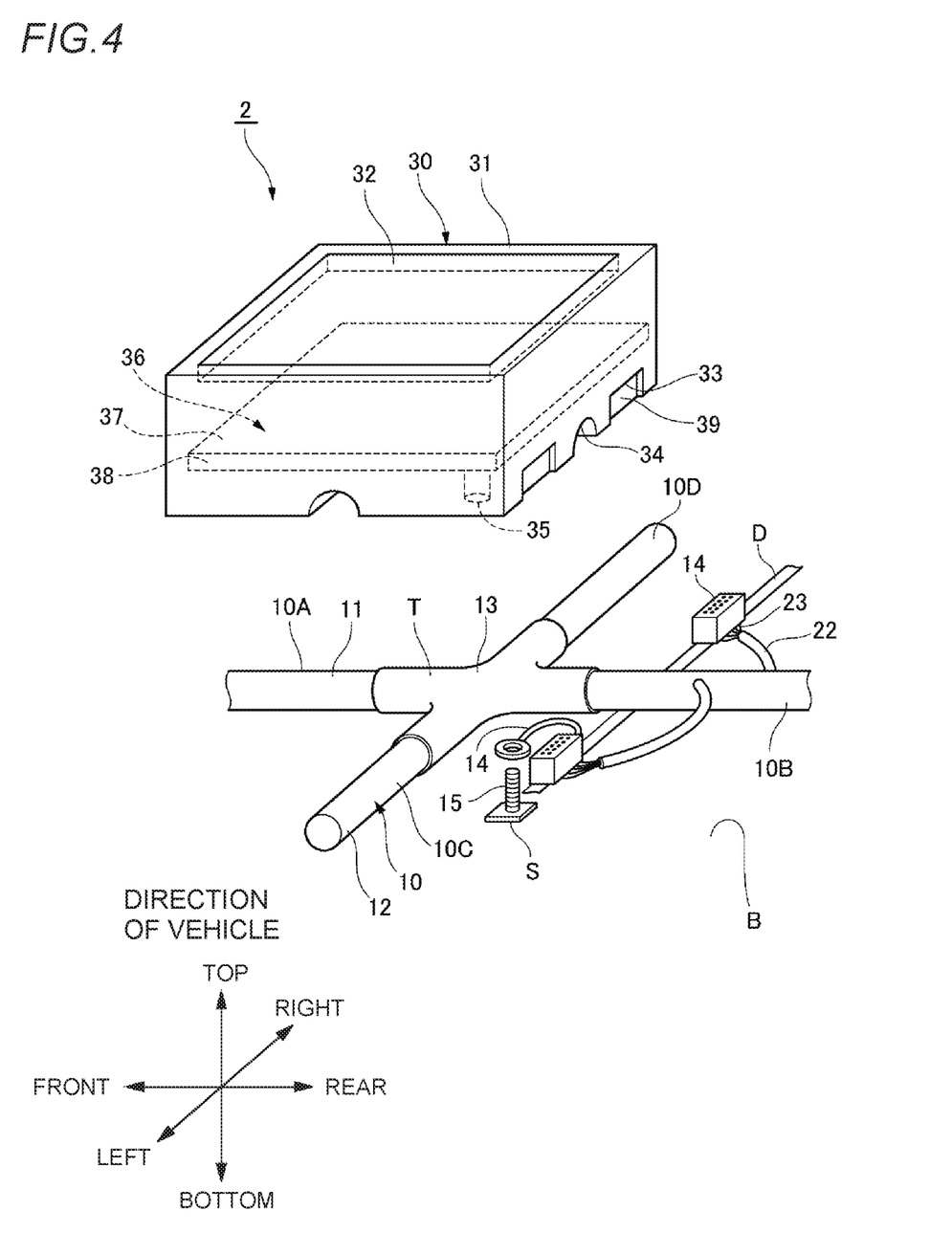
FIG. 4 is a perspective view illustrating a wire harness system according to a second embodiment of the present invention.
Figure 5:
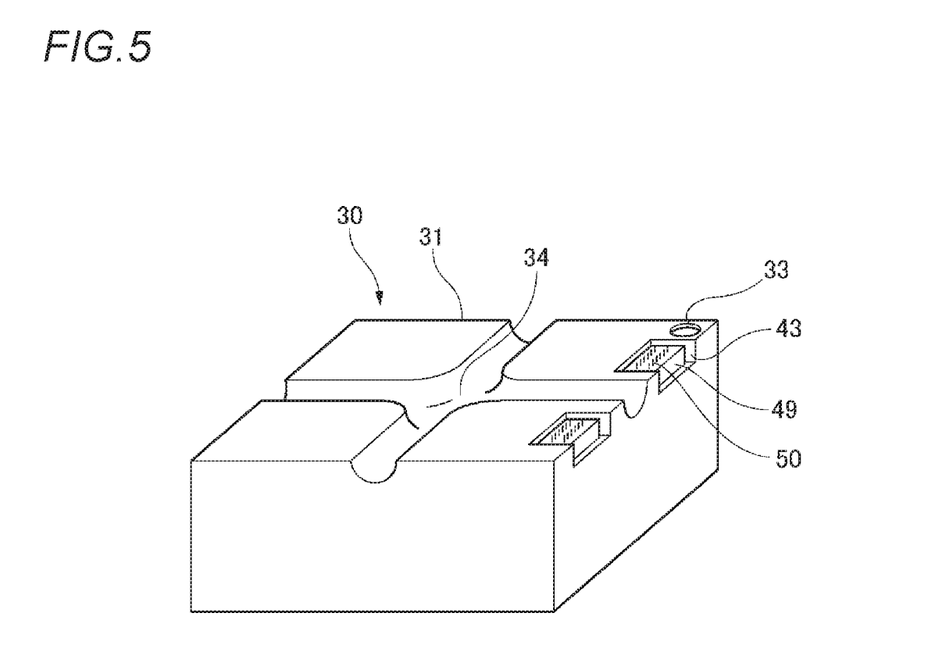
FIG. 5 is a perspective view showing a state where a connection unit shown in FIG. 4 is turned upside down.
Figure 6:
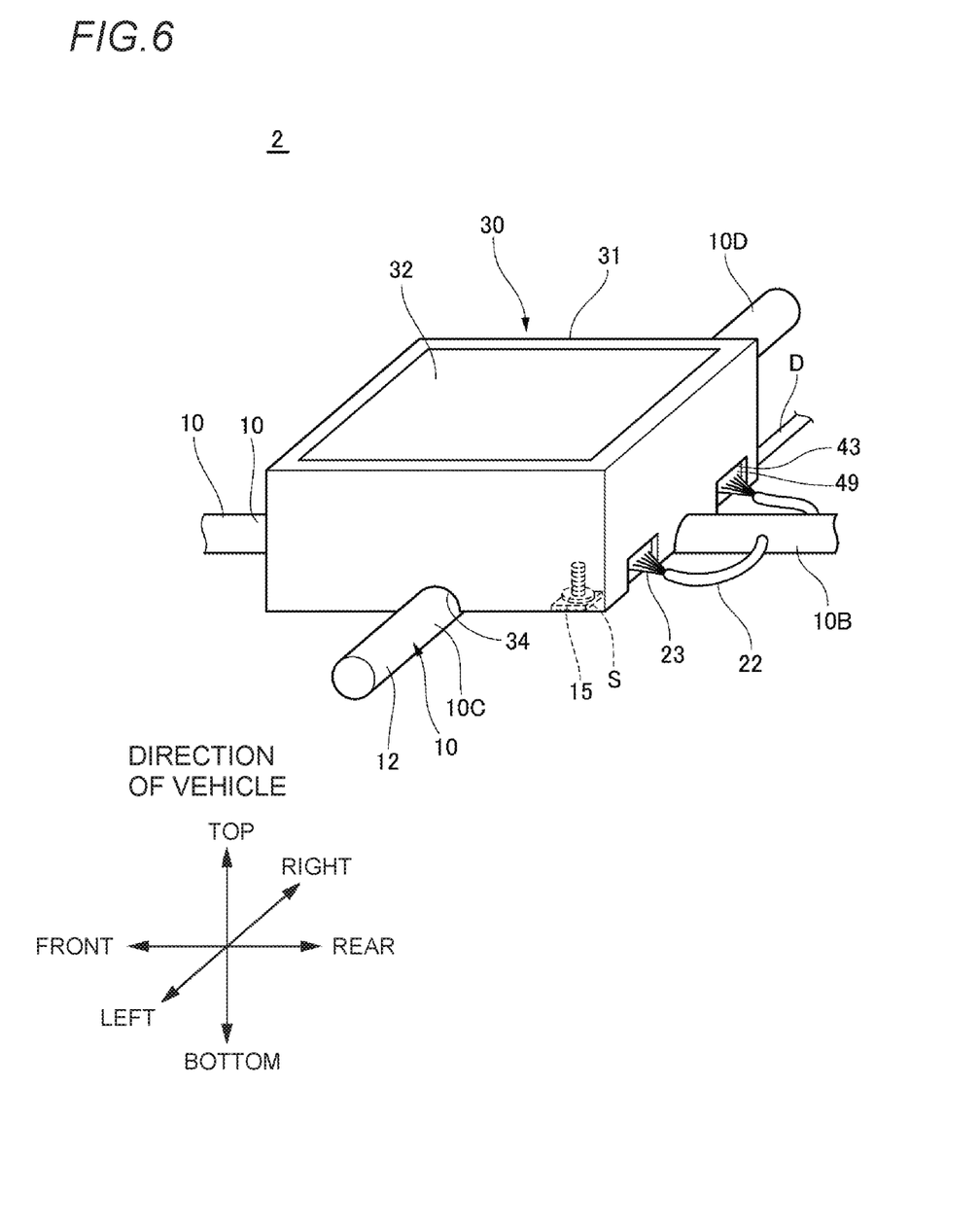
FIG. 6 is a perspective view showing a state where the connection unit shown in FIG. 4 is stacked and installed on trunk lines.

Next, a wire harness system 2 according to a second embodiment of the present invention will be described with reference to FIGS. 4 to 6. FIG. 4 is a perspective view illustrating the wire harness system 2 according to the present embodiment. FIG. 5 is a perspective view showing a state where the connection unit 30 shown in FIG. 4 is turned upside down. FIG. 6 is a perspective view showing a state where the connection unit 30 shown in FIG. 4 is stacked and installed on the trunk lines 11, 12.

The same or equivalent parts as or to those of the first embodiment are given the same or similar reference numerals in the drawings, and the description thereof is omitted or simplified.

(Description of Each Configuration Component)

As shown in FIGS. 4 to 5, in the present embodiment, two fitting holes 43 are formed on a back surface of the case 31 of the connection unit 30. The fitting hole 43 is disposed close to a side surface of the case 31 on the vehicle rear side, and is formed to be open toward the rear of the vehicle such that the selection circuit lines 23 can pass therethrough. The two fitting holes 43 are disposed to sandwich the housing groove 34 in the vehicle left-right direction. Unit-side connectors 49 are disposed on a back side of the circuit substrate 36 so as to be insertable into the fitting holes 43. The unit-side connector 49 is provided to be open to a lower side of the vehicle, and a plurality of connection portions 50 are similarly exposed toward the lower side of the vehicle. In the vehicle body B, a body groove D is formed to extend in the vehicle left-right direction, and the harness-side connectors 24 are respectively fitted and held in the body groove D with side surfaces facing each other.

In the present embodiment, the ground wire 14 is provided by being pulled out from one of the harness-side connectors 24 of the optional sub-harness 22.

As shown in FIG. 6, in the wire harness system 2 configured as above, when the case 31 of the connection unit 30 is stacked and installed on the trunk lines 11, 12 of the wire harness 10, simultaneously with the installation, the harness-side connectors 24 of the optional sub harness 22 are connected to the unit-side connectors 49 of the connection unit 30.

Other configurations are similar to those of the first embodiment.

(Advantage of Wire Harness System of Second Embodiment)

As described above, according to the wire harness system 2 of the present embodiment, the two fitting holes 43 are formed on the back surface of the case 31 of the connection unit 30, and the two harness-side connectors 24 are respectively fitted and held in the body groove D of the vehicle body B. Further, simultaneously with the installation of the connection unit 30, the harness-side connectors 24 of the optional sub-harness 22 are connected to the unit-side connectors 49 of the connection unit 30. Accordingly, work efficiency can be improved by simplifying assembling of the wire harness 10.

Other operational effects are similar to those of the first embodiment.

Third Embodiment

Figure 7:
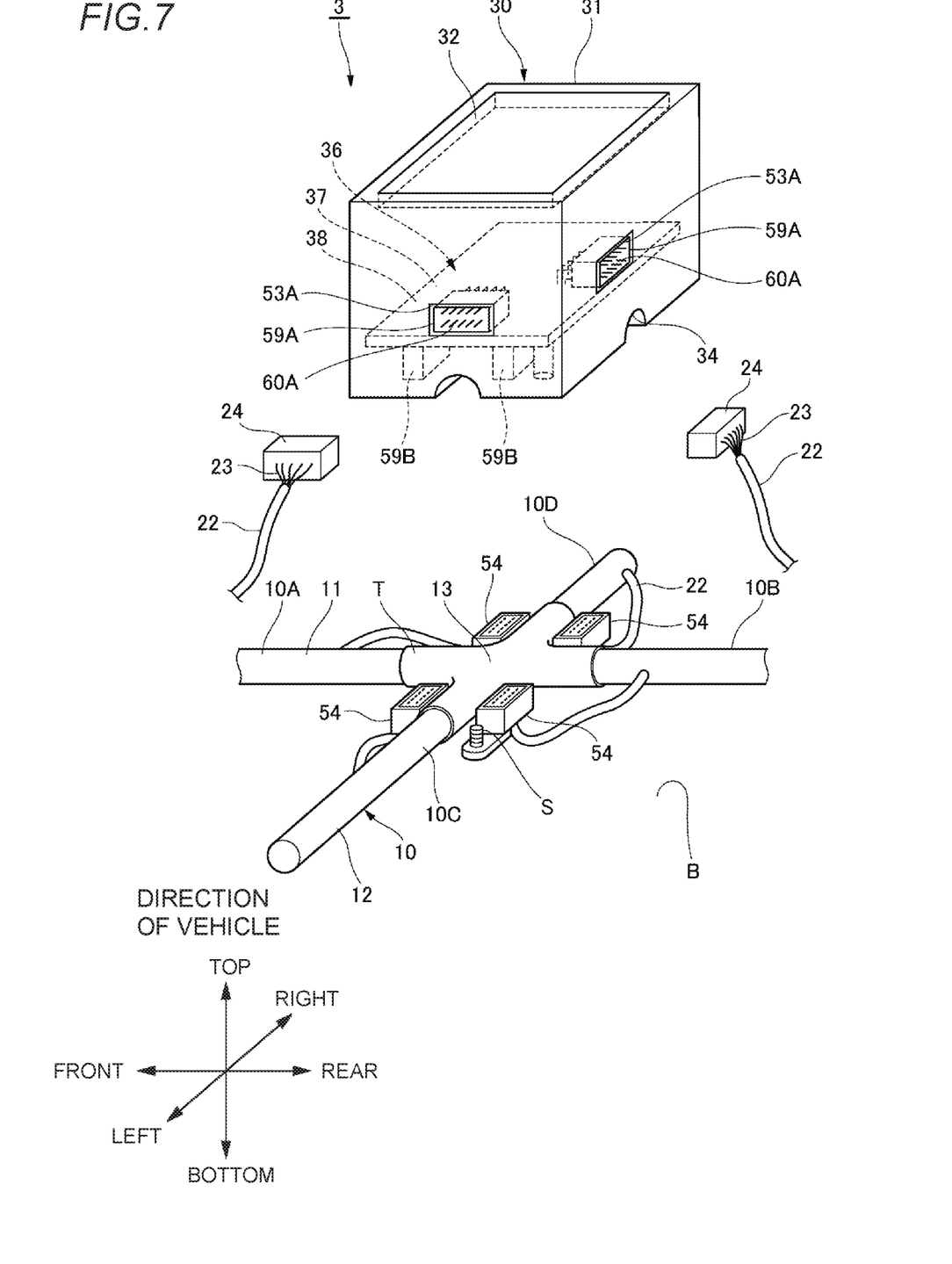
FIG. 7 is a perspective view of a wire harness system according to a third embodiment of the present invention.
Figure 8:
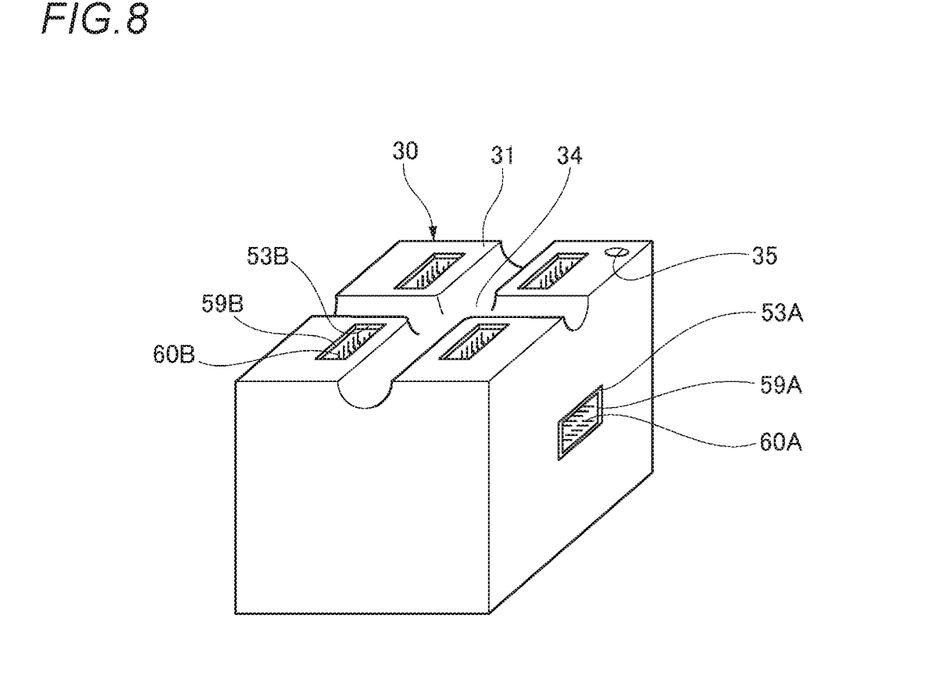
FIG. 8 is a perspective showing a state where a connection unit shown in FIG. 7 is turned upside down.
Figure 9:
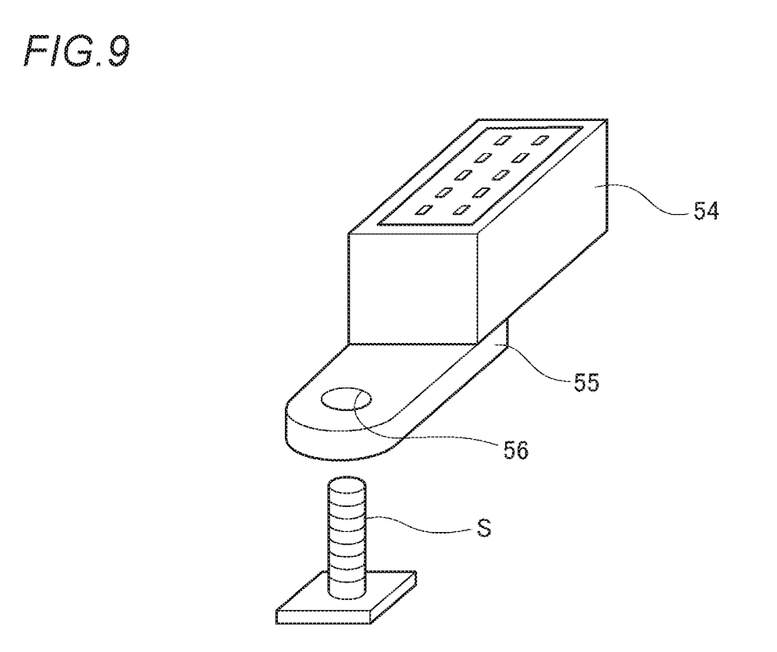
FIG. 9 is a perspective view illustrating a harness-side connector provided at a tip end of an optional sub-harness shown in FIG. 7.
Figure 10:
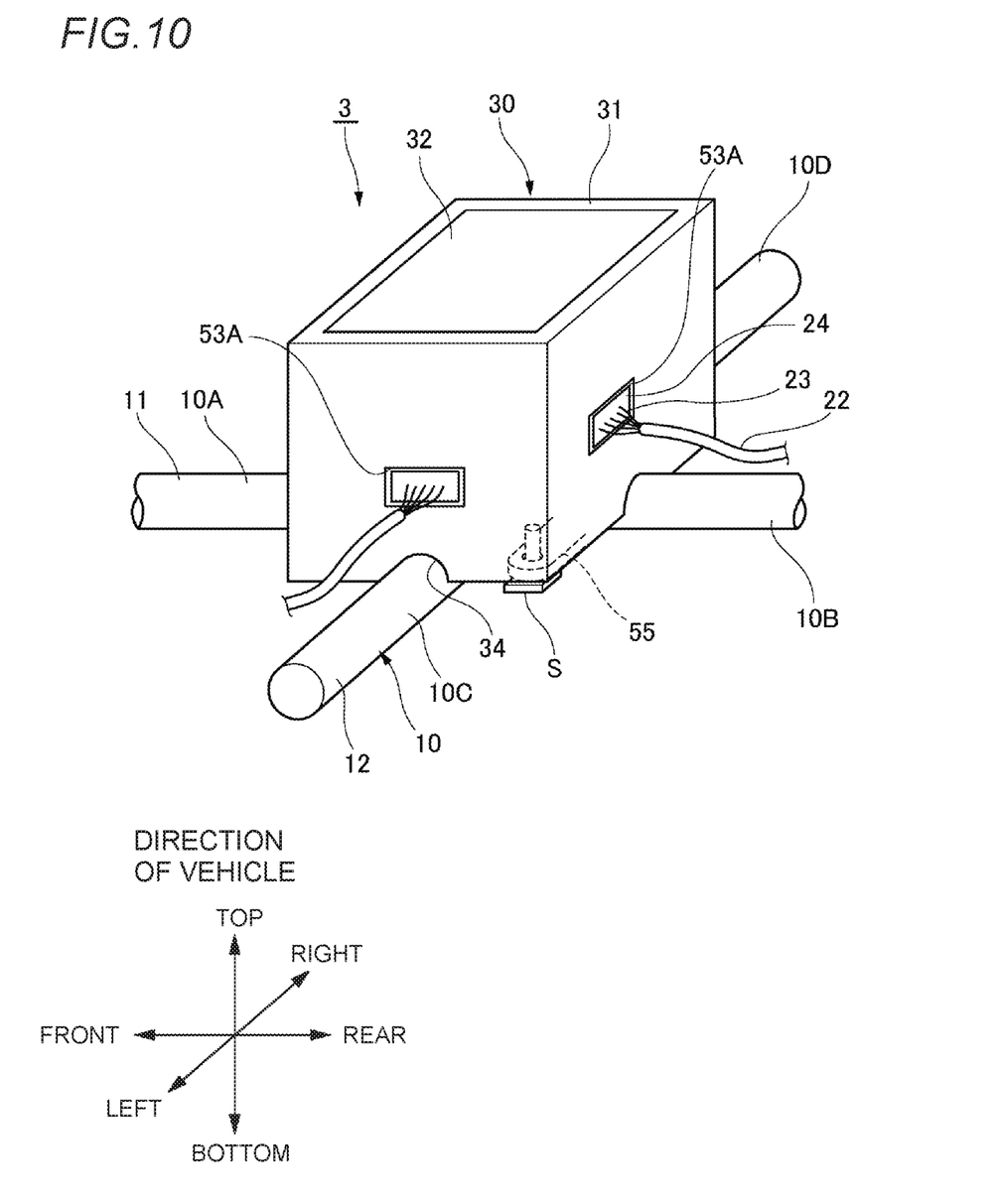
FIG. 10 is a perspective view showing a state where the connection unit shown in FIG. 7 is stacked and installed on trunk lines.

Next, a wire harness system 3 according to a third embodiment of the present invention will be described with reference to FIGS. 7 to 10. FIG. 7 is a perspective view illustrating the wire harness system 3 according to the present embodiment. FIG. 8 is a perspective view showing a state where the connection unit 30 shown in FIG. 7 is turned upside down. FIG. 9 is a perspective view illustrating a harness-side connector 54 provided at a tip end of the optional sub-harness 22 shown in FIG. 7. FIG. 10 is a perspective view showing a state where the connection unit 30 shown in FIG. 7 is stacked and installed on the trunk lines 11, 12.

The same or equivalent parts as or to those of the first and second embodiments are given the same or similar reference numerals in the drawings, and the description thereof is omitted or simplified.

(Description of Each Configuration Component)

As shown in FIGS. 7 and 8, in the present embodiment, one fitting hole 53A is formed in each of side surfaces on the vehicle rear side and the vehicle left side of the case 31 of the connection unit 30. Further, four fitting holes 53B are formed on the back surface of the case 31. The four fitting holes 53B on the back surface of the case 31 are disposed to sandwich the housing groove 34 in the vehicle front-rear direction and the vehicle left-right direction. That is, the fitting holes 53B are formed corresponding to four corners in the back surface of the case 31. Unit-side connectors 59A, 59B are disposed on both front and back surfaces of the circuit substrate 36 so as to be insertable into the fitting holes 53A, 53B. The unit-side connectors 59A on the circuit substrate 36 are disposed to be open to vehicle lateral sides, and a plurality of connection portions 60A are exposed toward the vehicle lateral sides. The unit-side connectors 59B on the hack surface of the circuit substrate 36 are disposed to be open to a lower side of the vehicle, and a plurality of connection portions 60B are exposed toward the lower side of the vehicle.

Further, in order to correspond to the unit-side connectors 59B on the back surface of the case 31 of the connection unit 30, four harness-side connectors 54 are disposed to sandwich the intersecting portion 13 of the wire harness 10 and the periphery thereof in the vehicle front-rear direction and the vehicle left-right direction. The optional scab-harness 22 provided with the four harness-side connectors 54 branch from the front side portion 10A, the rear side portion 10B, the left side portion 10C, and the right side portion 10D of the wire harness 10 so as to be routed on the vehicle body B.

As shown in FIG. 9, a thin plate-shaped ground terminal 55 is integrally provided on the harness-side connector 54 which is surrounded by the rear side portion 10B and the left side portion 10C of the wire harness 10. One end portion of the ground terminal 55 is connected to a ground connection portion (not shown) of the harness-side connector 54. A bolt insertion hole 56 is formed at the other end portion of the ground terminal 55, and the stud bolt S is inserted into the bolt insertion hole 56 to ground the ground terminal 55.

As shown in FIG. 9, in the wire harness system 3 configured as above, the case 31 of the connection unit 30 is stacked and installed on the trunk lines 11, 12 of the wire harness 10. Simultaneously with the installation, the harness-side connectors 54 of the optional sub-harness 22 disposed adjacent to the intersecting portion 13 of the wire harness 10 and the periphery thereof are connected to the unit-side connectors 59B of the connection unit 30 provided on the back surface of the case 31, respectively.

Other configurations are similar to those of the first and second embodiments.

(Advantage of Wire Harness System of Third Embodiment)

As described above, according to the wire harness system 3 of the present embodiment, the four fatting holes 53B are formed on the back surface of the case 31 of the connection unit 30, and the unit-side connectors 59B and the harness-side connectors 54 are arranged corresponding to the four fitting holes 53B. Further, the harness-side connectors 54 are disposed to sandwich the intersecting portion 13 of the wire harness 10 and the periphery thereof in the vehicle front-rear direction and the vehicle left-right direction. Accordingly, in a case where the harness-side connectors 54 of the optional sub-harness 22 disposed adjacent to the intersecting portion 13 of the wire harness 10 and the periphery thereof are connected to the unit-side connectors 59B of the connection unit 30 provided on the back surface of the case 31, the connection unit 30 can be more stably installed on vehicle body B, and a movement (displacement) of wire harness 10 can be more firmly regulated.

Other operational effects are similar to those of the first and second embodiments.

Although the description of the specific embodiments is completed above, aspects of the present invention are not limited to these embodiments, and may be appropriately modified, improved, or the like.

Here, characteristics of the embodiments of the wire harness systems 1, 2, 3 according to the present invention described above are summarized briefly in the following [1] to [4], respectively.

[1] A wire harness system (1, 2, 3) includes: a wire harness (10) including a standard sub-harness (20) configured by standard circuit lines (21) and an optional sub-harness (22) configured by selection circuit lines (23); and a connection unit (30) including a circuit network (38) configuring a part of circuit lines for realizing selectively added specification in the wire harness (10), the optional sub-harness (22) in the wire harness (10) is branched from a corresponding trunk line (11, 12) of the wire harness (10), and the selection circuit lines (23) of the optional sub-harness (22) branched from the trunk line (11, 12) of the wire harness (10) are connected to the circuit network (38) of the connection unit (30).

[2] In the wire harness system (1, 2, 3) described in [1], the wire harness (10) is disposed on a body of a vehicle (vehicle body B), and the connection unit (30) is stacked on an upper side of the trunk lines (11, 12) of the wire harness (10).

[3] In the wire harness system (1, 2, 3) described in [2], the connection unit (30) further includes a case (31), and the case (31) is configured to accommodate the circuit network (38) therein, and one surface of the case (31) facing the trunk lines (11, 12) of the wire harness (10) when being stacked on the trunk lines (11, 12) is supported by the body (vehicle body B) avoiding the trunk lines (11, 12).

[4] In the wire harness system (1, 2, 3) described in [3], the wire harness (10) is provided with harness-side connectors (24, 54) at a tip end portion of the optional sub-harness (22) branched from the trunk line (11, 12) of the wire harness (10), the connection unit (30) is provided with win-side connectors (39, 49, 59A, 59B) at the circuit network (38), the unit-side connectors are inserted in fitting holes (33, 43, 53A, 53B) formed in side surfaces of the case (31), and the harness-side connectors (24, 54) and the unit-side connectors (39, 49, 59A, 59B) are fitted to each other.

What is claimed is:

1. A wire harness system comprising:

a wire harness including a standard sub-harness configured by standard circuit lines and an optional sub-harness configured by selection circuit lines, and a connection unit including a circuit network configuring a part of circuit lines for realizing selectively added specification in the wire harness, wherein a portion of the optional sub-harness is bundled to the standard sub-harness such that the portion of the optional sub-harness extends together with the standard sub-harness to form a trunk line, the optional sub-harness in the wire harness includes a branched portion that is branched from the trunk line of the wire harness and extends from the trunk line to the connection unit, the selection circuit lines of the optional sub-harness branched from the trunk line of the wire harness are connected to the circuit network of the connection unit, the connection unit includes a case that removably contains the circuit network within the case, the case has an outer surface and a groove in the outer surface, the trunk line extends along the case in the groove such that the trunk line lies outside of the case, the wire harness is disposed on a body of a vehicle, the connection unit is stacked on an upper side of the trunk line of the wire harness, the outer surface contacts and is supported by the body of the vehicle, and the trunk line is located between the groove, of the outer surface of the case, and the body of the vehicle.

2. The wire harness system according to claim 1, wherein the wire harness is provided with a harness-side connector at a tip end portion of the optional sub-harness branched from the trunk line of the wire harness, the connection unit is provided with a unit-side connector at the circuit network, and the unit-side connector is inserted in a fitting hole formed in a side surface of the case, so that the harness-side connector and the unit-side connector are fitted to each other.

3. The wire harness system according to claim 1, wherein a cross section of the groove is an arc shape, the arc shape of the groove is formed with a predetermined gap with respect to the trunk line.

4. The wire harness system according to claim 1, wherein the groove has a C-shaped cross-section.

5. The wire harness system according to claim 1, wherein the groove includes a first groove portion and a second groove portion integrally formed together in a cross shape, the trunk line includes a first trunk line portion and a second trunk line portion that intersection each other in a cross shape, the first trunk line portion extends along the connection unit in the first groove portion, and the second trunk line portion extends along the connection unit in the second groove portion.

6. The wire harness system according to claim 1, wherein the case includes a first side with an opening and a second side opposite to the first side, the connection unit further includes a lid detachably connected to the first side of the case and configured to selectively open and close the opening such that the lid selectively covers and exposes the circuit network, and the groove is formed on the second side of the case.

* * * * *